Feb. 20, 1951    B. T. TAYLOR    2,542,165
LOOSE-LEAF BINDER COMBINATION
Filed Feb. 3, 1947    3 Sheets-Sheet 1

INVENTOR.
B. T. Taylor
BY Robert Cobb
Attorneys.

Feb. 20, 1951     B. T. TAYLOR     2,542,165
LOOSE-LEAF BINDER COMBINATION
Filed Feb. 3, 1947     3 Sheets-Sheet 2

INVENTOR.
B. T. Taylor
BY Robbet Robb
Attorneys

Feb. 20, 1951  B. T. TAYLOR  2,542,165
LOOSE-LEAF BINDER COMBINATION
Filed Feb. 3, 1947  3 Sheets-Sheet 3

INVENTOR.
B. T. Taylor
BY Robert Robb
Attorneys

Patented Feb. 20, 1951

2,542,165

UNITED STATES PATENT OFFICE 2,542,165

LOOSE-LEAF BINDER COMBINATION

Bernard T. Taylor, Scarborough, Ontario, Canada

Application February 3, 1947, Serial No. 725,989

2 Claims. (Cl. 129—1)

My invention pertains to the art of looseleaf binders and fillers therefor, such as used for checkbooks, stock certificates, notebooks, or the like, the filler usually comprising leaf sections made up on one or more checks, or certificates, or blank pages, and a stub section affording a permanent record concerning the subject matter of the leaf sections.

The primary object of my invention has been to devise a looseleaf binder and filler of the class referred to, in which the filler is retained in the binder by ring-like, or open ring members adapted for peculiar cooperation with a special novel form of clamping member that will maintain the filler section, and the said ring-like members connected therewith, in proper position in the binder.

Ancillary to the binder, filler, ring members, and clamping member combinations above referred to, I utilize a novel form of jacket adapted to be folded around the stub section of the filler after the leaf section has been exhausted or used up, for facilitating recording and storage of the stub section as a permanent record.

Normally in carrying out the latter phase of my invention I employ the said jacket as an auxiliary means to assist in the clamping of the filler section in position in the binder, the jacket normally lying flat beneath the filler section when the latter is mounted or connected to the binder by the ring-like holding means previously mentioned. After the leaf section of the stub section of the filler is used up, the jacket will be folded around the stub section after the manner above suggested, and after the stub section has been detached from the ring holding means comprising the ring-like members previously referred to, such operation being performed after detachment of the clamping member that cooperates to maintain the filler and jacket in place in the binder.

The various novel features of my invention, their construction and operation will be understood more fully upon reference to the following detail description, and the accompanying drawings, in which.

Figure 9:
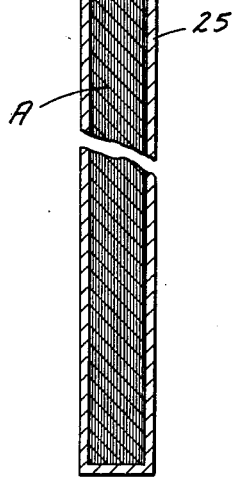

Figure 9 is a vertical sectional view illustrating how the filler is preferably disposed in a suitable form for facilitating the maintaining of the filler in a vertical position while the stub jacket is being engaged with the ring or ring-like members already laced through the apertures of the stub section of the filler, so to speak; the view further depicting the first manner of disposing the stub jacket, shown partially broken away, in the initial operation of engaging the stub jacket apertures with the hooks of corresponding sides of ring members and forming the end fold of the jacket.

Figure 10:
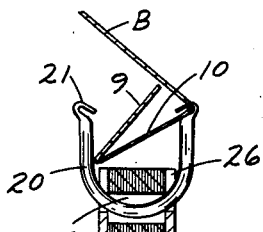

Figure 10 is a view somewhat similar to Figure 9, with the form and filler sections broken away, however, this view depicting the second step of engaging both of the end folds of the stub jacket with the hooks of the ring-like members previously referred to.

Figure 11:
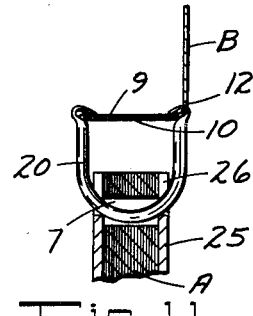

Figure 11 is a view similar to Figure 10, showing how the double fold of the jacket is raised to engage the folded ends thereof with the hook members of the ring members that are opposite to the hook members that engage the openings in the jacket.

Figure 12:
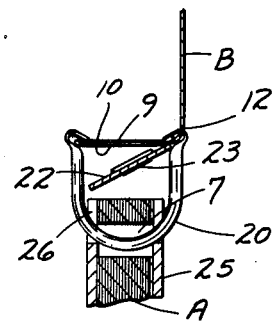

Figure 12 is a view showing the parts in the position of Figure 11 as previously described, but now illustrating the mode of introducing the clamping member between the sides of the ring members, effected by a longitudinal movement of the clamping member, and said clamping member being disposed in the position it assumes just previous to moving it into interlocked position with both of the sides of each ring member, as well as preliminary to its assuming a position in flat contact with the fold of the stub jacket.

Figure 13:
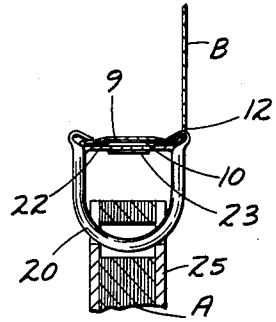

Figure 13 is a view similar to Figure 12, but in this view the clamping member has been raised so as to lie flat against the fold portion of the jacket, and has both of its longitudinal edges interengaged with the sides or legs of the ring-like holding members for the filler.

Figure 14:
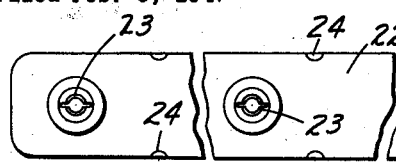

Figure 14 is a top plan view broken at intervals and illustrating the clamping member alone, bringing out the arrangement of the female snap fasteners which are carried by this member.

Figures 15, 16:
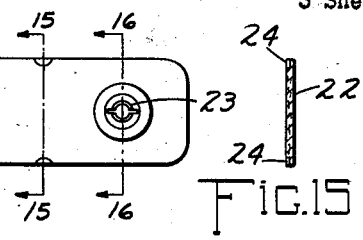

Figure 15 is a cross-sectional view taken on the line 15—15 of Figure 14 which shows the clamping member.

Figure 16 is a cross-sectional view taken on the line 16—16 of Figure 14, in which line one of the female snap fasteners is located.

Figure 17:
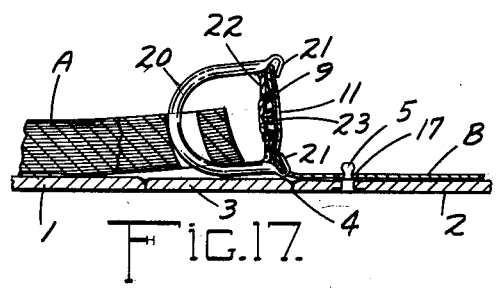

Figure 17 is a fragmentary view depicting the binder in which my filler and clamping means and jacket are mounted, with the binder laid out in flat open condition, the top and bottom covers broken away, showing how the filler with its connected ring-like members with which are engaged the fold portion of the stub jacket is first arranged so that it lies on the top cover of the binder for facilitating the engagement of the perforations or apertures of the stub jacket with the male snap fasteners on the bottom cover of the binder.

Figure 18:
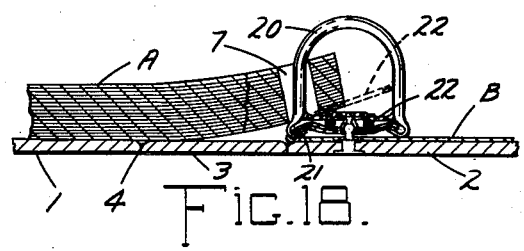

Figure 18 is a view similar to Figure 17, showing the ring-like members swung from their sidewise inoperative positions to their correct operative positions with the legs thereof perpendicular to the bottom cover member and with the clamping member interengaged with the ring-like members and the fold of the jacket pressed down to engage its female snap fasteners with the male snap fasteners on the lower cover member.

Figure 19:
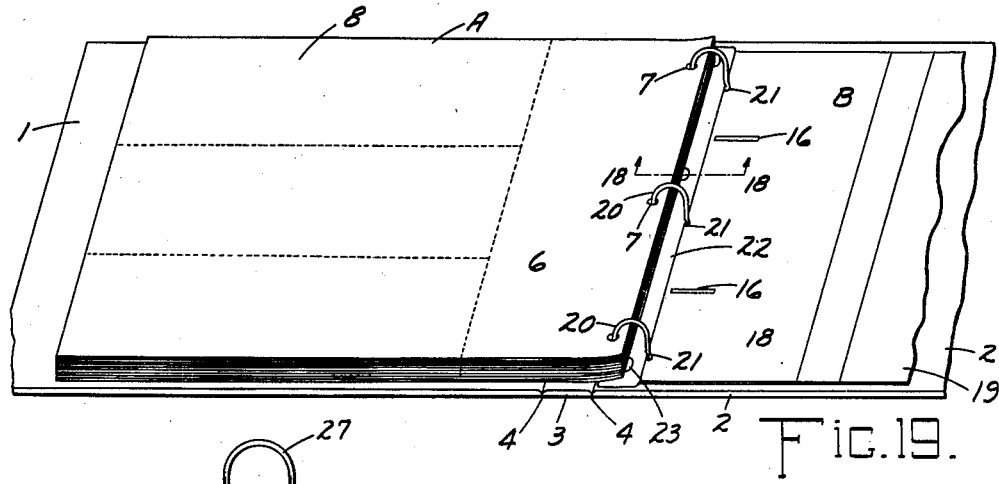

Figure 19 is a perspective view of the parts in the positions in which they are shown in Figure 18, the view showing the filler section primarily and the manner in which the jacket member lies flat upon the back cover of the binder. From the position of the parts shown in Figure 19, the filler section is swung over onto the back section of the binder to the position of Figure 1, when it is ready for actual use for the issuing of checks, certificates, or the like.

Figure 3:
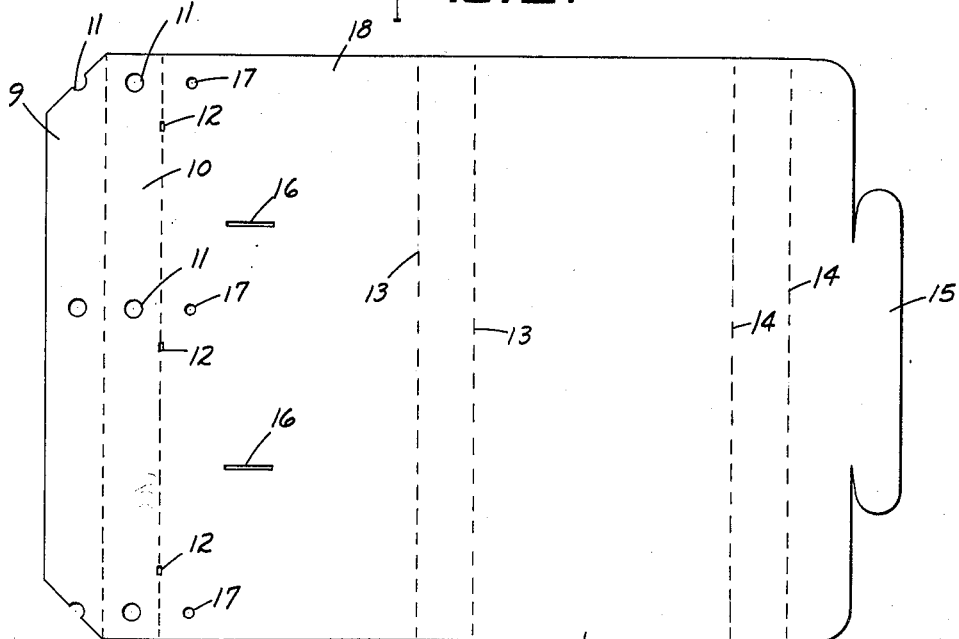
Figure 3 is a plan view of the stub jacket alone as when it is laid out flat in the condition in which it is inserted in the binder below the filler.
Figure 20:
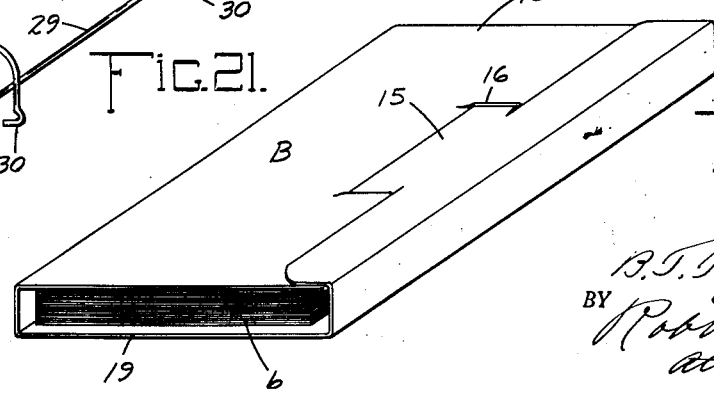

Figure 20 is a view showing the stud section of the filler section removed from the binder and having the jacket of Figure 3 folded about the same ready to be properly endorsed with record indicia for storing.

Figure 21:
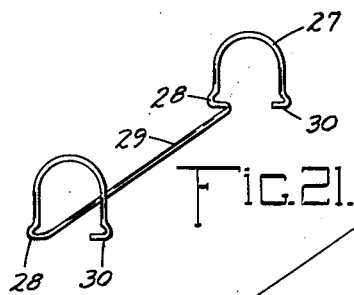

Figure 21 is a perspective view of a modified form of ring-like holding unit structure that may be employed in lieu of the separate ring-like members illustrated in other figures of the drawings.

The binder which I use in connection with my invention is almost of a conventional type. It comprises the front or top cover 1, the bottom cover 2, and the back 3. The covers 1 and 2 are hinged to the back 3 in any customary manner as shown at 4. On the back cover 2, as seen best in Figure 17, and spaced from the lower ends 4 to the right are a plurality of male snap fasteners 5. These extend vertically from the cover 2, and, as later will be described, cooperate as a part of the clamping means of my invention.

The filler which I use is conventional. It comprises the stub section 6 formed with apertures 7 near its free edge, and provided with the leaf section 8 which, according to the illustration, is divided into a plurality of check sections by means of perforated lines in the customary manner.

While I have illustrated a filler for the showing of my invention, which filler is a check type filler with plural check sections, my invention may be adapted, in smaller form, to single check fillers, or the filler may be merely one in which the leaf section is of blank paper of any suitable size.

The leaf section may also be made unperforated so as to provide stock certificates suitably printed after known practice.

The primary unique and novel features of my invention reside in the novel form of the ring or ring-like members which I use for holding the filler section in the binder, the novel stub jacket means, and the clamping devices that are employed and now to be shortly described.

Passing to Figure 3, the stub jacket of my invention, and which may or may not be used in conjunction with the clamping means, dependent upon the particular purposes of the invention, is fully shown in its normal flat condition. This jacket comprises a main body sheet of more or less heavy paper stock, at the left end of which, as illustrated, are score lines providing an outer fold member 9 and fold member 10.

The members 9 and 10 are provided with ring member receiving apertures, or part apertures, designated 11. At the score lines between the fold 10 and the body of the jacket there are located a plurality, any suitable number, of small slots 12. Score lines across the middle portion of the jacket enable folding of the jacket to provide a side fold partly enclosing the stub section when the latter is received in the jacket. Another side fold is provided between the score lines 14 adjacent to the flat end of the jacket, at which end the flap 15 is located. The end portions of the flap 15 are separated from the body sheet of the jacket so that they provide tabs which may be inserted in the longitudinal slots 16 in the body sheet of the jacket located not far from the fold 10. The manner of engagement of the flap 15 with the slot 16 is well shown in Figure 20.

On a line between the slot 16 and the score line on which the small slots 12 are located, I provide the jacket with apertures 17 adapted to fit over the male snap fasteners 5 on the back cover 2. The jacket is of course so divided by the various score lines as to provide the top section 18 and the bottom section 19, as seen in Figure 20.

Figure 4:
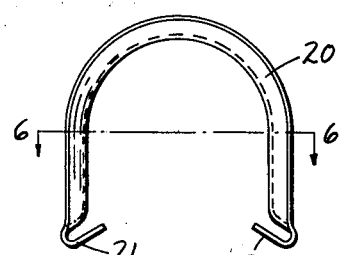
Figure 4 is a view in side elevation of one of the ring-like filler holding members used in my combination structure.
Figure 5:
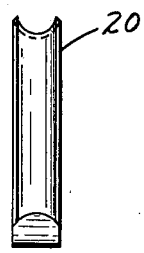
Figure 5 is an edge or end view of the members shown in Figure 4.
Figure 6:
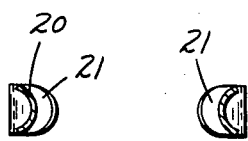
Figure 6 is a view taken on the line 6—6 of Figure 4.

I next refer to Figures 4, 5, and 6 of the drawings to show the construction of my holding members for the filler of the binder, these holder members being generally called herein ring members, though not of complete ring form, but rather of ring-like form, specifically stated. I use the term "ring members" somewhat in the sense of the general art of ring binders and in the sense of being descriptive rather than to limit the construction of such members to precise ring form. Each ring member, at least two of which will be employed, and a larger number in reference to larger type binders, consists of a body of U-form approximately, designated 20, the extremities of the legs of the body being formed with peculiar slanting hook members 21, the lower portions of which slant slightly upwardly and toward a line longitudinally central between the legs mentioned. The ends of the legs are cut off parallel with the direction of slant of the lower ends of the hook members 21, or perhaps I should say the lower sides of said hook members. Preferably I make the ring members 20 of a convex-concave cross section by using suitable material of semi-tubular shape in cross section, but I do not wish to be restricted to this feature of detail construction, which is shown best in Figures 5 and 6.

The peculiar formation of the hook member 21 is an essential feature of my invention, because it enables the ring members 20 to have peculiar interlocking engagement with the fold portion of the jacket for the stub-section, if used, and with the clamping member for attaching the filler to the back cover 2 of my binder, and which clamping member is always necessarily employed.

I next refer to the form of my clamping member which is excellently shown in Figure 14, and in sectional views in Figures 15 and 16. This clamping member is made of a strip of rather heavy paper board or fiber board material, the member being designated 22 and being of relatively long rectangular form. Said clamping member 22 is wider than the space between the legs of the ring members 20 for a reason to be hereafter set forth. In length, the clamping member 22 is dimensioned so that it is substantially as long as the width of the binder at the back portion 3 of the latter, or the width of either of the cover members, so far as this feature is concerned.

The clamping member 22 is equipped with a plurality of female snap fasteners 23 which are spaced to register with the several male snap fasteners 5 on the back cover 2 of my binder, with which latter the snap fasteners 23 are designed to cooperate.

At the longitudinal edges thereof the clamping member 22 may be formed, though not necessarily so, with flattened weakened portions that appear as recesses 24 in Figure 14, and in the nature of slitted portions in Figure 15. These portions 24 may not be used necessarily, but when used they have a function that will be pointed out later herein.

The foregoing presents the structural features of my binder, my detachable ring members, my filler, my clamping means, and my jacket structure, if the latter is used, as is preferred. I now proceed to a description of the manner of assembling the above various features that form parts of my invention, with a binder and filler section or filler, such as has been fully described above.

Figure 7:
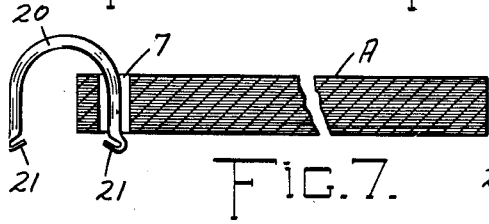
Figure 7 is a view illustrating the manner in which the initial step of connecting the ring-like holding member with the filler is depicted.
Figure 8:
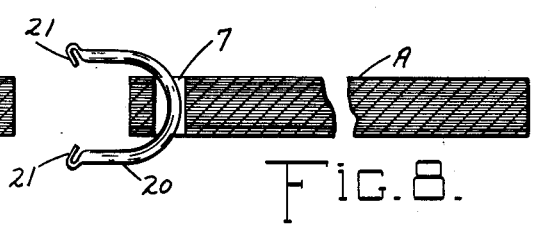
Figure 8 is a view similar to Figure 7, showing the secondary positioning of each of the ring-members passed through the apertures of the stub section of the filler, and preliminary to the attachment of the stub jacket to the ring members and filler.

The ring or holding members 20 are first engaged with the filler, generally denoted at A, which also may be characterized as a refill, in the manner shown in Figures 7 and 8. For convenience in assembling the stub jacket, generally designated B, in operative relation with the members 20, I may use a form 25 such as wholly or partially shown in Figures 9 to 13 inclusive, consisting of a simple rectangular box in which the filler may be received, the open end of the box having vertical slots 26 spaced apart a distance corresponding with the distance of the spacing of the apertures 7 in the sub-section of the filler A. Supported in suspension from a couple of the ring members 20, the filler may be deposited in the frame or box 25 in a self-evident manner, the several hooks 21 of the several members 20 being uppermost and conveniently disposed for the interengagement of the jacket B. The jacket B is now folded at the fold end having the fold portion 9 and 10 so as to bring the folds 9 and 10 into a position like that illustrated in Figure 9. While in such position, the slots 12 at the angle of the fold 10 with the stub section 18 of the filler are interengaged as shown in Figure 9 with the right hand hooks 21. As previously stated, the width of the fold portions 9 and 10 is slightly greater than the distance or space between the legs of the ring or holding members 20. The relation of the parts being established as in Figure 9, the free edge of the fold portion 9 is interengaged with the hooks 21 at the right by bending the fold 9 and springing said edge into such engagement, after the manner illustrated in Figure 10. Then the two fold portions 9 and 10 are moved outwardly of the space between the legs of the members 20 so that the angle of the material connecting the members 9 and 10 is sprung into engagement with the left hand hook 21 of the members 20, as shown in Figure 11.

Figure 1:
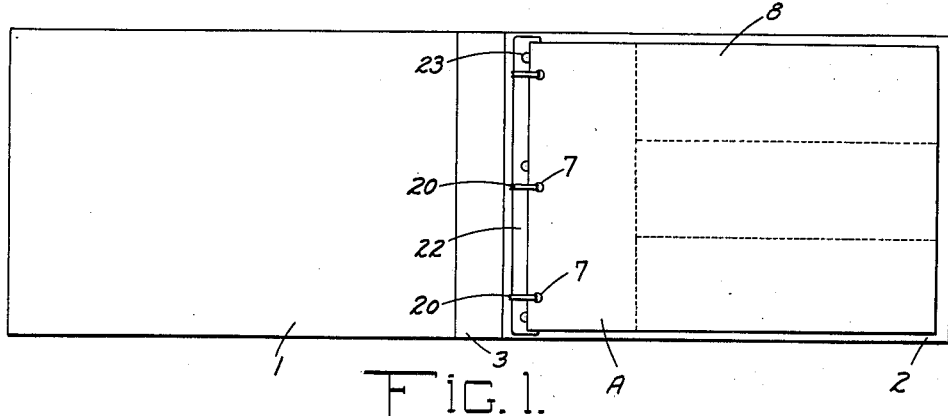
Figure 1 is a top plan view of a binder showing the filler therein held in place by the novel ring-like members and clamping member of my invention, the filler being of the type of fillers used in ordinary checkbooks and comprising a stub section and leaf sections, the leaf sections being divided into three checks by the usual perforation.
Figure 2:
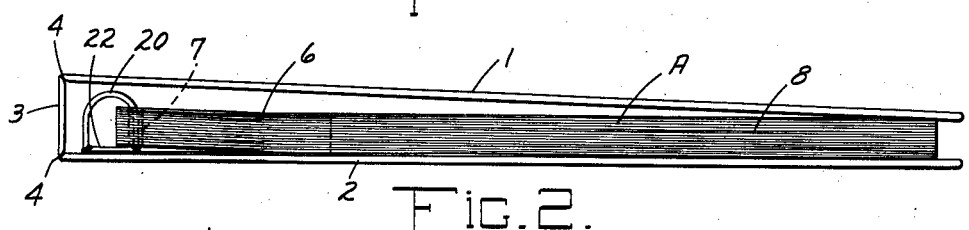
Figure 2 is a view of the parts shown in Figure 1, but illustrating the binder with the top cover closed down on the filler, the view being taken toward the lower edge of the filler, binder, and clamping parts combined.

Next, there will be introduced into proper position with relation to the members 20 the clamping member 22. To do this said clamping member is manipulated by longitudinal movement to enter the spaces between the legs of the several members 20, below or inwardly of the fold portions 9 and 10 as previously arranged, one edge of the clamping member 22 being engaged in the right hand sides of the members 20. The parts will now be arranged as shown in Figure 12, and the accurate positioning of the clamping member 22 may be indicated by disposing said clamp member so that the recesses or weakened portions 24 are precisely opposite and engaged with the inner sides of the right legs of the members 20. The next step is that depicted in Figure 13, which illustrates the clamping member raised at its previously lowered edge portion to bring it into a position substantially parallel with the fold portions 9 and 10 of the jacket. In accomplishing this operation, on account of the width of the clamping member, it will be practically sprung into engagement with the left hand sides of the ring or holding members 20, as seen in Figure 13. The parts A, B, 20, and 22 may now be lifted out of the box or form 25 and placed in the position illustrated roughly in Figure 17, in which they are supported on the binder which is now laid out flat after the manner shown in Figures 17 and 18; also in Figure 19. At this time, see Figure 17, the apertures or part apertures 17 of the jacket are disposed in positions in which the male snap fasteners 5 project therethrough and the jacket, the members 20, and the filler are properly lined up on the binder with the main body portion of the jacket comprising the parts 18, 19, and the flap 15 lying flat on the latter and primarily on the back cover 2. The filler and jacket are now ready for the final clamping thereof on the binder, and for this purpose the several members 20 are rocked from their sidewise disposed position in Figure 17 to the vertical position, with their legs vertical, as shown in Figure 18, thus bringing the female snap fasteners 23 of the clamp member 22 over the male snap fasteners 5, whereupon pressure down upon the fasteners 3 will interengage the same with the fasteners 5, and the filler and ring members and jacket will thus be properly clamped in the binder in substantially the position depicted in Figures 18 and 19. To render the binder and its contents ready for use, the filler is shifted or thrown over to the right hand position in which it is illustrated in Figures 1 and 2, and thereafter the parts of the leaf sections 8 may be dispensed and endorsements made on the stub section of the filler in a self-evident manner.

It is not necessary that the form 25 be used because the members 20 may be manipulated in relation to the filler when the filler is down on its side, somewhat as shown in Figure 17, resting on the binder. In such position the fold members 9 and 10 of the jacket may be manipulated and the clamping member 22 likewise handled for the assembling of the parts A, B, 21, and 22, after the manner described in conjunction with the showing of Figures 9 to 13 inclusive. For facilitating, however, the assembly of many original output binders and fillers of the type of my invention, the form 25 is most conveniently employed.

Now we will say that the filler, stubs, and leaves have been used in the ordinary way until all of the sections of the leaf parts, which are checks as illustrated, are exhausted. There will be left, of course, the stub section in place on the ring members 20. The stub section is now ready to be removed from the binder, and this is accomplished by lifting the clamping member 22 to disengage the female fasteners 23 thereof from the male fasteners 5. Likewise, the fold portions 9 and 10 of the jacket B are disengaged from the hooks on the members 20. These fold portions being freed from the members 20, and the clamping member 22 displaced, the ring members 20 are now removed from the stub section.

The stubs of the stub section of the filler are now ready to be wrapped in the jacket B by folding the jacket around the same in the manner illustrated in Figure 20, and thereupon the jacket may be endorsed with indicia desired to indicate the contents thereof in reference to filler stub sections, and stored away, the flap 15 quite positively holding the stub section in the wrapper afforded by the said jacket B.

A special advantage in the use of my invention lies in the fact that the holding means comprising the parts 20 are used over and over again, along with the clamping members, by being applied to refills or fresh fillers for the binder comprising the parts 1, 2 and 3. It is not necessary to discard the members 20, or store them away, with the stub sections with which they have been previously used.

I illustrate in Figure 21 a modified form of holding means which is made in a unit comprising a single piece of wire or strip material of a suitable nature. In this construction, in assembling the filler in relation to said means, the so-called ring members 27 correspond with the members 20 previously described, and certain of the hook members 28 thereof are connected by the integral cross rod or piece 29. The other hooks 30 are free hooks, and when this type of unit holding means is employed, the small slots 12 of the jacket will be interengaged with the hooks 20 and not with the hooks 28, because the latter expedient would be infeasible. In other words, the hooks 30 take the place of the right hand hooks of the members 20 as illustrated in the assembly operations depicted by Figures 9 to 13 inclusive.

Now it is within the purview of my invention to utilize the ring members 20, or the modified form thereof as shown in Figure 21, in conjunction with the clamping member 22, to effectively combine a filler with a binder after the manner described, even though the jacket B is entirely dispensed with. Under such conditions, of course, the operation of assembling the clamping member 22 to the hooks 20 and filler B would be performed as previously described, eliminating those steps of the assembly which I have presented in regard to the mode of interengaging the jacket folds 9 and 10 with the hooks of the holding members 20.

I have found in practice that by utilizing the several features of my invention that are presented in the foregoing description, I obtain a highly efficient looseleaf binder capable of very effectively clamping in position a filler in a handy way as regards attaching and detaching the same, and with which a jacket may be readily combined and used in the manner set forth. The clamping action of the clamping member 22 is highly efficient, and very firmly holds the filler A and the jacket B, when used, in position in the binder parts 1, 2, and 3. Having learned the opeartion of attaching and detaching the filler and jacket features in relation to the binder, the operator may perform these operations very readily and quickly.

Instead of using the arrangements of the parts as described in connection with Figures 12, 13, and 17, from the position of said parts as in Figure 11 they may be directly disposed as seen in Figure 18 with the clamping member 22 omitted. Then the member 22 may be inserted through the member 20 in the angular or inclined position disclosed by dotted lines, and forced downward to flatwise engage the jacket fold 10 and cause the fasteners 5 and 23 to be connected. At such time the edges of the member 22 of course engage the sides or legs of the members 20 with resilient holding action or friction maintained by the said fasteners 5 and 23.

Having thus described my invention, what I claim as new and desire to secure by Letters Patent of the United States, is:

1. A loose-leaf binder comprising a cover having male snap fasteners applied thereto at spaced intervals, a filler having perforations near one edge, ring-like holding members for attaching the filler to the cover comprising spaced sides connected together at corresponding ends and having engaging hooks extending inwardly toward each other at the opposite ends, and a removable clamping member comprising a long body portion equipped with female fastening members, having its edges intermediate of the hooks of the holding members, and the said female fastening members interengaged with the male members on the cover, the clamping member being transversely resilient for spring engagement with the sides of the holding members.

2. A loose-leaf binder comprising a cover having fasteners applied thereto, ring-like holding members for a filler to be received by the cover, and a clamping member adapted to enter the said holding members and having fasteners to coact with those on the cover, in which the holding members have spaced sides with hook parts, and the clamping member is detachable from the cover and wider than the space between the said sides and is resilient so as to be sprung into detachable engagement with said side parts.

BERNARD T. TAYLOR.

REFERENCES CITED

The following references are of record in the file of this patent:

UNITED STATES PATENTS

| Number | Name | Date |
|---|---|---|
| 1,369,131 | Schade | Feb. 22, 1921 |
| 1,791,916 | Watson | Feb. 10, 1931 |
| 1,831,148 | Smith | Nov. 10, 1931 |
| 1,841,603 | Hutson | Jan. 19, 1932 |
| 1,894,735 | Dawson | Jan. 17, 1935 |
| 2,083,432 | Coleman | June 8, 1937 |